United States Patent
Lee et al.

(10) Patent No.: US 8,866,836 B2
(45) Date of Patent: Oct. 21, 2014

(54) METHOD AND APPARATUS FOR DATA COMMUNICATION BASED ON DIGITAL IMAGE PROCESSING

(75) Inventors: Kyung-Woo Lee, Yongin-si (KR); Yun-Je Oh, Suwon-si (KR); Dae-Kwang Jung, Suwon-si (KR); Jeong-Seok Choi, Yongin-si (KR); Hong-Seok Shin, Suwon-si (KR); Dong-Jae Shin, Seoul (KR); Sung-Bum Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1134 days.

(21) Appl. No.: 12/608,555

(22) Filed: Oct. 29, 2009

(65) Prior Publication Data
US 2010/0110088 A1 May 6, 2010

(30) Foreign Application Priority Data
Oct. 30, 2008 (KR) .................. 10-2008-0107124

(51) Int. Cl.
*G09G 5/02* (2006.01)
*H04N 1/00* (2006.01)

(52) U.S. Cl.
CPC ....... *H04N 1/00307* (2013.01); *H04N 1/00251* (2013.01); *H04N 1/00129* (2013.01); *H04N 1/00302* (2013.01)

USPC ........................................... 345/589; 235/494

(58) Field of Classification Search
None
See application file for complete search history.

(56) References Cited

U.S. PATENT DOCUMENTS 7,499,567 B2* 3/2009 Shimosato .................... 382/100
8,006,911 B2* 8/2011 Yi et al. ........................ 235/494

* cited by examiner

*Primary Examiner* — Antonio A Caschera
(74) *Attorney, Agent, or Firm* — The Farrell Law Firm, P.C.

(57) ABSTRACT

A data communication apparatus based on digital image processing includes a display that displays a color block array including color blocks corresponding to transmission data. The data communication apparatus also includes a camera that captures an image of a color block array displayed on a display of a transmitting side, and a storage that stores a code table including information about colors mapped to data values. The data communication apparatus further includes a Digital Signal Processor (DSP) that creates a color block array by converting transmission data to color blocks according to the code table during data transmission, identifies the color block array in the image captured by the camera, detects colors of color blocks in the color block array, and extracts data values corresponding to the detected colors during data reception.

18 Claims, 7 Drawing Sheets

FIG.8

METHOD AND APPARATUS FOR DATA COMMUNICATION BASED ON DIGITAL IMAGE PROCESSING

PRIORITY

This application claims priority under 35 U.S.C. §119(a) to a Korean Patent Application filed in the Korean Intellectual Property Office on Oct. 30, 2008 and assigned Serial No. 10-2008-0107124, the contents of which are incorporated herein by reference.

BACKGROUND OF THE INVENTION

1. Field of the Invention

The present invention relates generally to a data communication method and apparatus, and more particularly, to a method and apparatus for data communication based on processing of an image captured by a digital camera in a mobile device equipped with the digital camera.

2. Description of the Related Art

Short-range data communications generally take place between mobile devices or between a mobile device and an electronic device such as a television or a monitor by wireless technology such as a wired connection, Bluetooth®, Wireless Local Area Network (WLAN), infrared Data Association (IrDA) and Visible Light Communication (VLC).

Conventional data communication schemes require a user to carry a cable and other wireless communication technologies allow communications only with the use of associated wireless communication chips and transceivers such as an antenna. A mobile phone enables data communications via an antenna over a wireless communication network for which services a user is charged.

When planning to transmit or receive a large amount of data using a mobile phone, a user is significantly concerned about the charges. At present, Bluetooth® has limitations in its effectiveness in large-data transmission because it supports only a bandwidth of about several hundred Kbps.

WLAN, based on Institute of Electrical and Electronics Engineers (IEEE) 802.11 b, g, n standards, is not suitable for a mobile device due to a large power consumption. There are 16-Mbps products that have been commercialized for IrDA communications, but these products provide poor compatibility because the mobile devices are equipped with 4-Mbps products. Although VLC has recently emerged, visible light is difficult to identify in a communication environment that is bright and affected by noise due to ambient light.

SUMMARY OF THE INVENTION

An aspect of the present invention is to address at least the problems and/or disadvantages and to provide at least the advantages described below. Accordingly, an aspect of the present invention is to provide a short-range communication method and apparatus for enabling transmission and reception of a large amount of data using a camera and a display.

In accordance with an aspect of the present invention, there is provided a data communication apparatus based on digital image processing, in which a display displays a color block array including color blocks corresponding to transmission data, a camera captures an image of a color block array displayed on a display of a transmitting side, a storage stores a code table including information about colors mapped to data values, and a DSP creates a color block array by converting transmission data to color blocks according to the code table during data transmission, and identifies the color block array in the image captured by the camera, detects colors of color blocks in the color block array, and extracts data values corresponding to the detected colors during data reception.

In accordance with another aspect of the present invention, there is provided a data transmission method for data communication based on digital image processing, in which transmission data is converted to color blocks according to a code table including information about colors mapped to data values, the number of color blocks to be included in a color block array to be displayed is determined, and a color block array including the determined number of color blocks is displayed.

In accordance with a further aspect of the present invention, there is provided a data reception method for data communication based on digital image processing, in which an image of a color block array displayed on a display of a transmitting side is captured, the color block array is identified in the captured image, colors of color blocks in the color block array are detected, and data values corresponding to the detected colors are extracted according to a code table including information about colors mapped to data values.

BRIEF DESCRIPTION OF THE DRAWINGS

The above and other aspects, features, and advantages of embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE EMBODIMENTS

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

The present invention provides a data communication method and apparatus in which a transmitting communication apparatus converts transmission data to colors using a device equipped with a digital camera and a display such as a Liquid Crystal Display (LCD), an Organic Light Emitting Diode (OLED), and displays an array of blocks in the colors on the display, and a receiving communication apparatus captures an image of the color block array by a digital camera and recovers the original data represented in the color blocks by processing the captured image.

Figure 1:
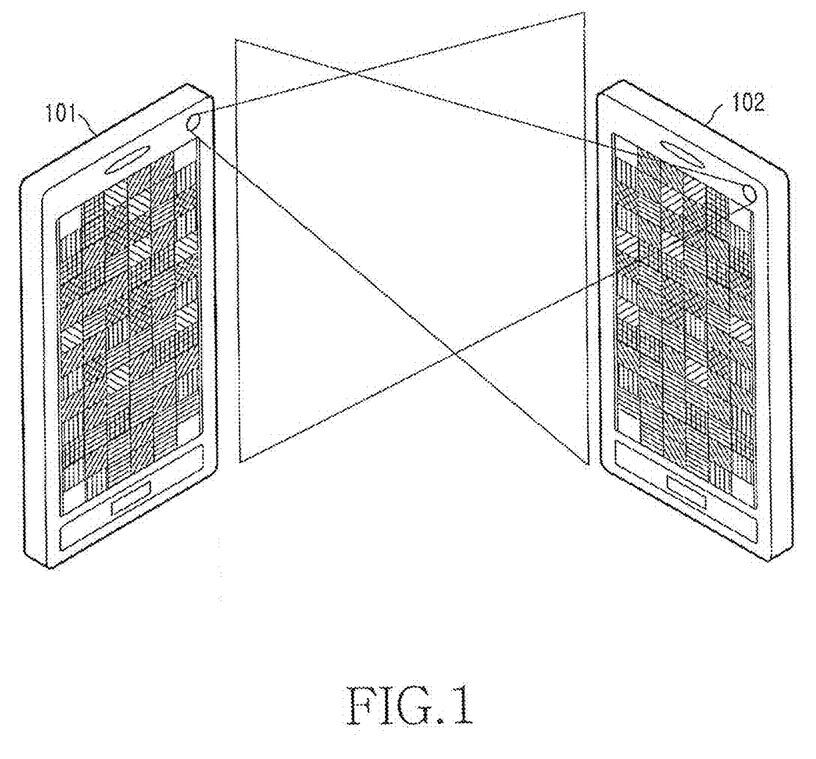
FIG. 1 illustrates a state where a transmitting terminal and a receiving terminal are in alignment during data communications according to the present invention.

FIG. 1 illustrates a state where a transmitting terminal and a receiving terminal are in alignment during data communications according to the present invention. In FIG. 1, two terminals 101 and 102 communicate with each other, and each of the terminals 101 and 102 includes a display for displaying transmission data as an array of color blocks and a camera for capturing the display of the other terminal. During data communications, the camera of one terminal is steered toward the display of the other terminal, to thereby capture the display.

Figure 2:
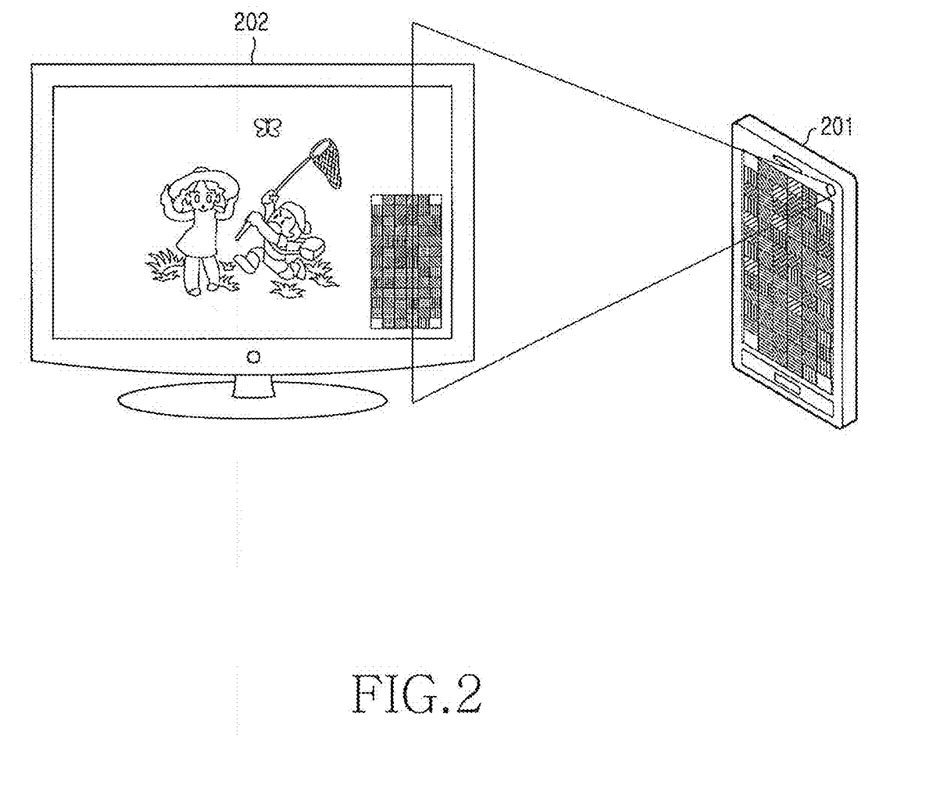
FIG. 2 illustrates data communications between a monitor and a mobile device according to the present invention.

FIG. 2 illustrates data communications between a monitor and a mobile device according to the present invention. Referring to FIG. 2, in addition to data communications between mobile devices, an electronic device equipped with a display such as a monitor 202 broadcasts data to a mobile device 201 by displaying a color block array on its entire or partial screen. If the monitor 202 is provided with a camera, bi-directional communications are possible between the two devices.

Figure 3:
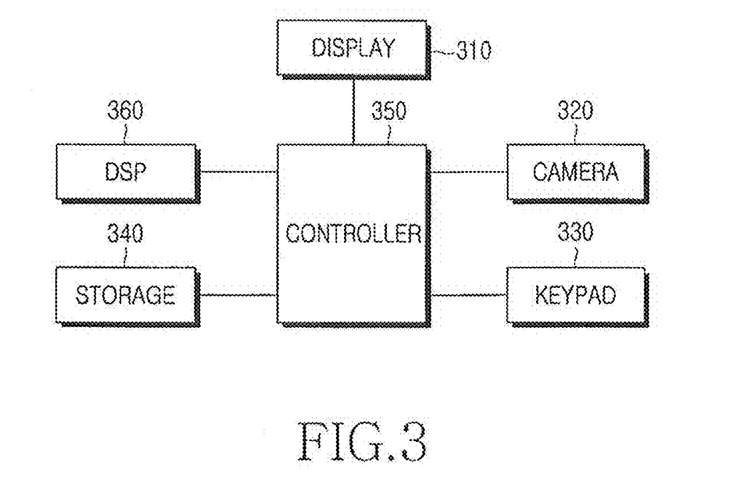
FIG. 3 illustrates a data communication apparatus according to the present invention.

FIG. 3 illustrates a data communication apparatus according to the present invention. Referring to FIG. 3, the data communication apparatus includes a display 310, a camera 320, a keypad 330, a storage 340, a controller 350 and a Digital Signal Processor (DSP) 360.

The display 310 displays image information, particularly an array of color blocks to which transmission data is converted according to a code table in accordance with the present invention.

The controller 350 controls each component of the data communication apparatus. Specifically, the controller 350 sets the number of color blocks for an initial color block array by increasing the number of color blocks until it receives a response message indicating that the color blocks are not recognizable from a receiving communication apparatus, when the data communication apparatus serves as a transmitter. For data reception, the controller 350 transmits to a transmitting communication apparatus a response message indicating that color blocks are recognizable, if the recognition rate of each color block an image captured when the transmitting communication apparatus sets the number of colors blocks for an initial color block array, is equal to or greater than a set value. If the color recognition rate of each color block is below the set value, the controller 350 transmits a response message indicating that the color blocks are not recognizable to the transmitting communication apparatus.

The camera 320 captures an array of color blocks displayed on the display of the other data communication apparatus.

The keypad 330 provides input information corresponding to a user-pressed key to the controller 350.

The storage 340 stores data necessary for data transmission with the data communication apparatus, including a code table or color list having color information corresponding to each data value (e.g., binary data such as '0001'), and color information corresponding to color block sizes and color block array shapes.

For data transmission, the DSP 360 forms a color block array by converting transmission data to color blocks according to the code table, so that the transmission data is represented as colors. For example, binary data '0001' is converted to white, '0010' to red. '0011' to green, and '0100' to blue and color blocks corresponding to the binary data are displayed on the display 310. When receiving data, the DSP 360 performs an image process for data recovery by selecting an area of an image captured by the camera 320, sensing the color blocks of the selected area, and converting the colors of the color blocks to their corresponding data values.

In accordance with the present invention, the DSP 360 also locates a color block array representing data and calibrates brightness by identifying corner blocks that are flickering in the captured image, calibrates colors by analyzing the colors of blocks neighboring to the corner blocks, and determines the number of the color blocks in the array and the shape of the color block array. The image captured by the camera 320 may vary in resolution that enables color recognition depending on the luminance of the display of the other communication apparatus and ambient illuminance.

Figure 4:
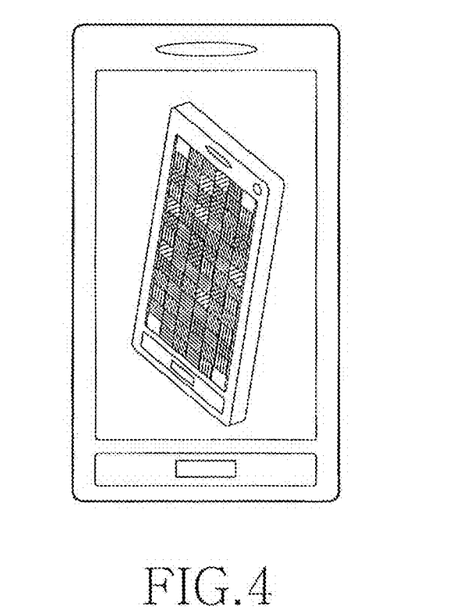
FIG. 4 illustrates an image of a display of the transmitting terminal captured by the receiving terminal during data communications according to the present invention.

FIG. 4 illustrates an image of a display of the transmitting terminal captured by the receiving terminal during data communications according to the present invention. In actual communications, an image captured by the receiving communication apparatus may be a parallelogram instead of a rectangle, as illustrated in FIG. 4. Therefore, the receiving communication apparatus should locate a color block array representing actual data in the captured image. A color block array detection method will be described later with reference to FIG. 6.

Figure 5:
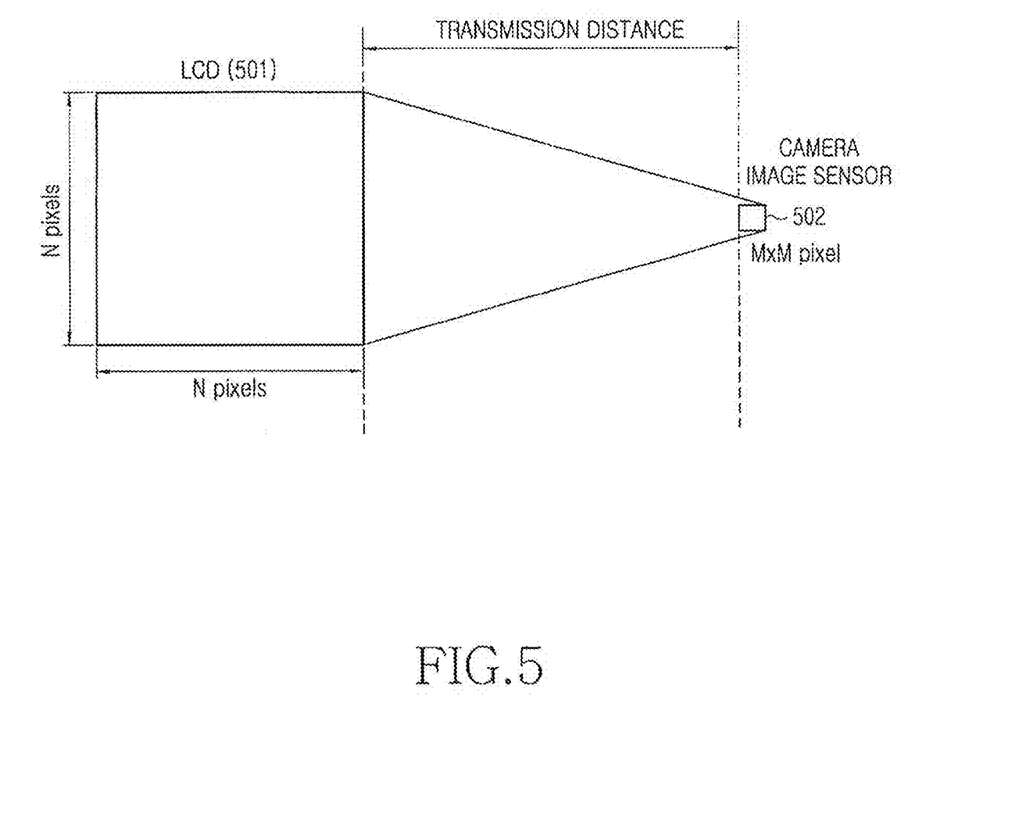
FIG. 5 illustrates a block displayed on the display of the transmitting terminal and a block received at an image sensor of the receiving terminal during data communications according to the present invention.

FIG. 5 illustrates a block displayed on the display of the transmitting terminal and a block received at an image sensor of the receiving terminal during data communications according to the present invention. Referring to FIG. 5, an N×N block 501 in a color block array displayed on the display of the transmitting communication apparatus is captured to a smaller M×M block 502 by the receiving communication apparatus. The size of the captured color blocks decreases in proportion to the distance between the transmitting and receiving communication apparatuses.

Accordingly, the number of pixels per block in the display of the transmitting communication apparatus should be set, taking into account factors such as the resolution of the display, the resolution of the camera, a transmission distance and an ambient environment. In this context, a block size is determined by displaying a small number of blocks of data in an initial communication stage, determining whether the receiving communication apparatus can recognize color blocks, and then adjusting a communicable transmission rate.

Figure 6:
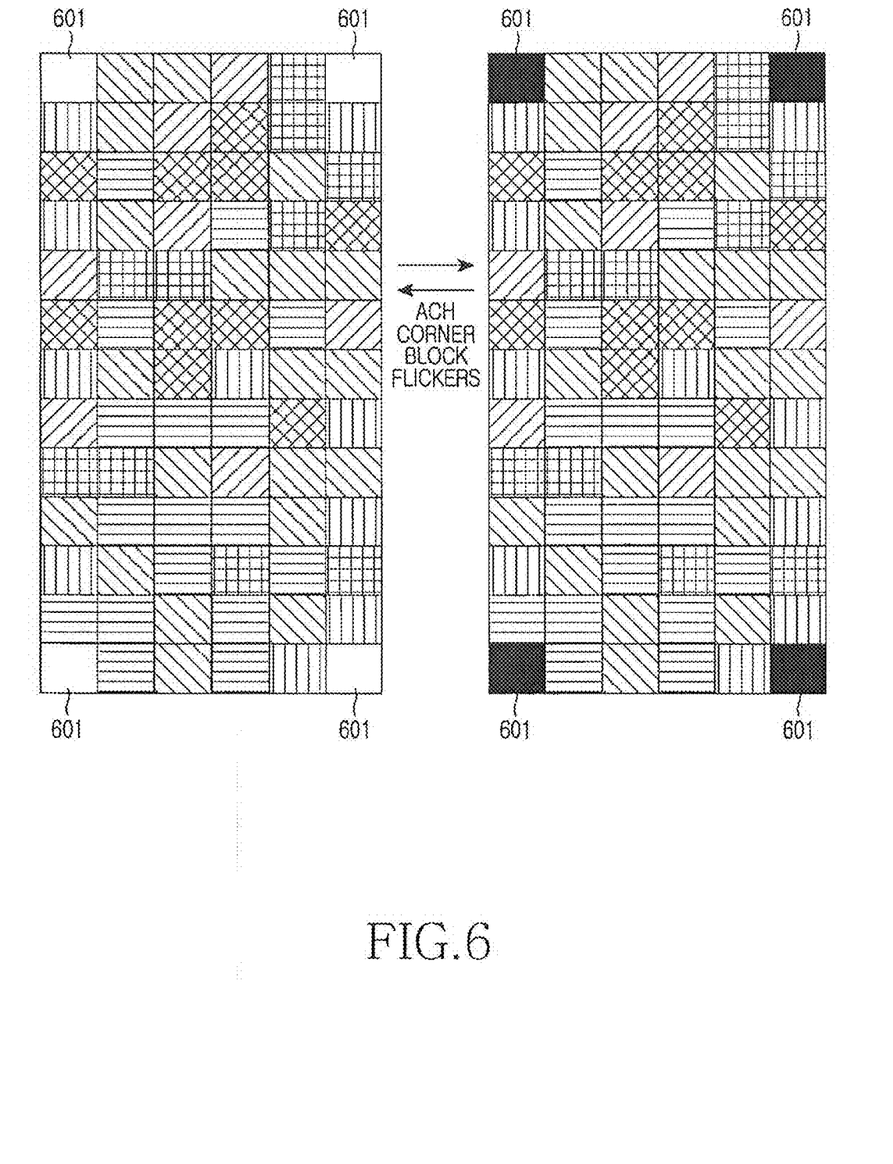
FIG. 6 illustrates an operation for illuminating on and off corners of a display in order to enable displayed data to be identified during data communications according to the present invention.

FIG. 6 illustrates an operation for causing corners of a display to flicker in order to indicate data displayed on a display during data communications according to the present invention.

The camera of the receiving communication apparatus captures a screen of the display of the transmitting communication apparatus at a rate of 30 or more frames per second in moving picture mode during data communications. Corner blocks 601 of a color block array on the display of the transmitting communication apparatus are illuminated on and off periodically, as illustrated in FIG. 6.

Thus, the receiving communication apparatus senses blocks flickering at every interval and recognizes a square or a parallelogram with the flickering blocks as its four corners as a color block array representing data. The DSP 360 of the receiving communication apparatus calibrates the brightness of the camera 320 in such a manner that flickering white and black values of the captured image have 0 and 255, respectively. Since three of the four corner blocks are sufficient for identifying a square color block array displayed in the transmitting communication apparatus, the other one corner block may be used to represent other information needed for communications. This information may include a data rate, the number of colors used and the number of blocks used.

Figure 7:
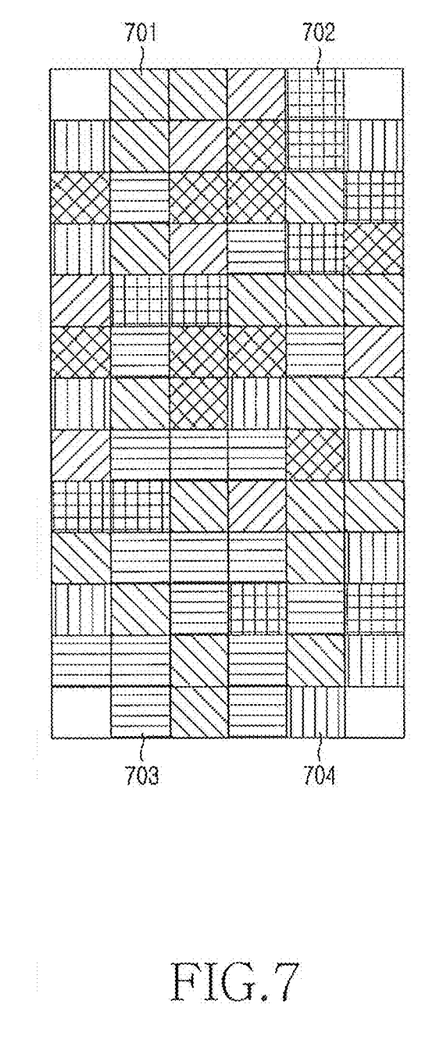
FIG. 7 illustrates blocks referred to for describing a color calibration and a decision as to the number of blocks for a color block array in a display displaying data during data communications according to the present invention.

FIG. 7 illustrates blocks referred to for describing a color calibration and a decision as to the number of color blocks for a color block array in a display displaying data during data communications according to the present invention. Herein, Red, Green, Blue (RGB) color calibration is performed using blocks neighboring to the four corner blocks, as illustrated in FIG. 7. For example, blocks 701, 702 and 703 are set to Red, Green, and Blue, respectively, so that the DSP 360 of the receiving communication apparatus may perform RUB calibration. The color calibration may be performed simultaneously with the brightness calibration described above with reference to FIG. 6.

In the present invention, a block 704 neighboring to a corner block, other than the three blocks 701, 702 and 703 used for color calibration may carry information indicating the total number of blocks in the color block array and the shape of the color block array. For example, when the color block array is of size 8×6, the block 704 is displayed in red. When the color block array size is set to 16×12, the block 704 is displayed in green. In this manner, the total number of blocks and the shape of the color block array may be indicated by the block 704 by mapping numbers of blocks and array shapes to colors.

Figure 8:
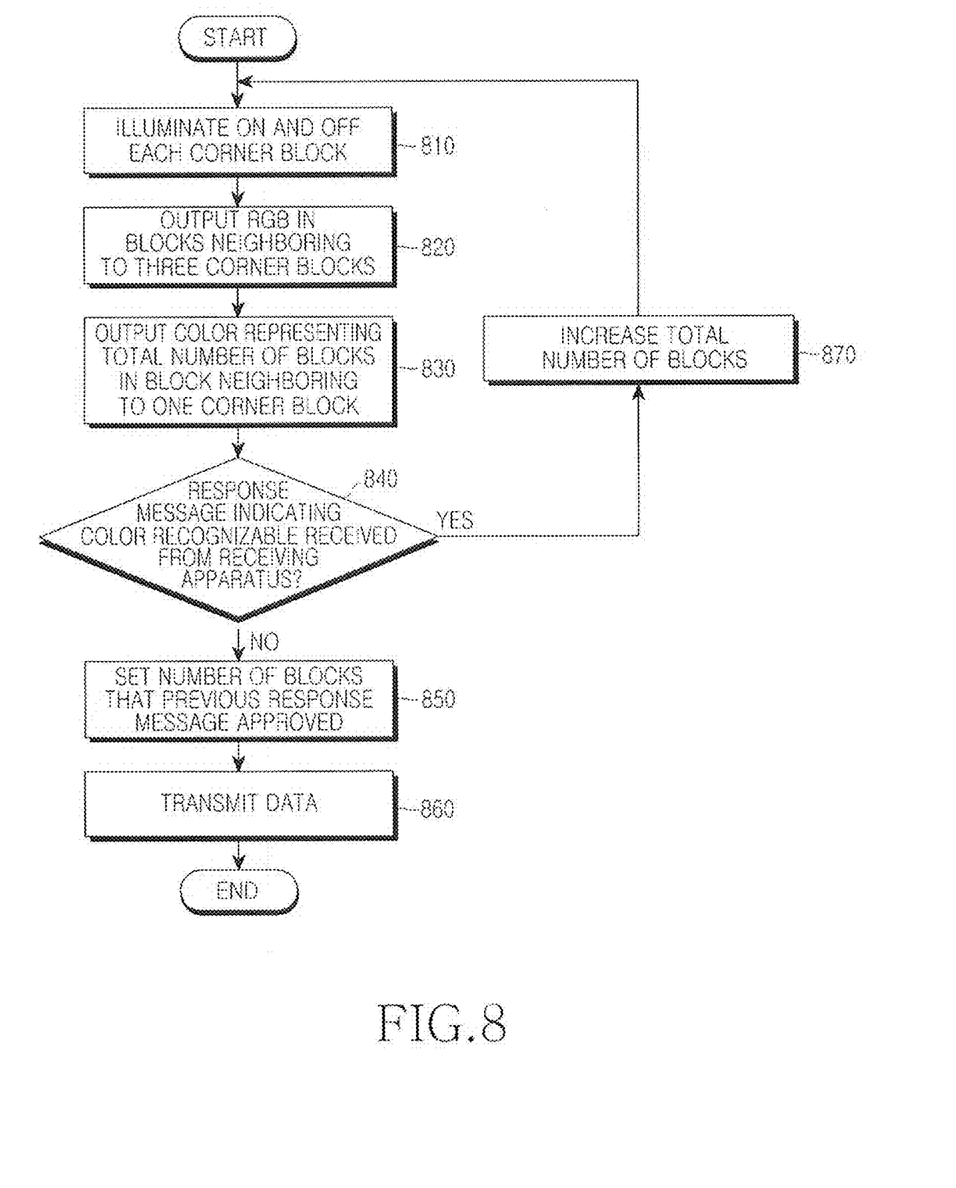
FIG. 8 displayed a data communication operation according to the present invention.

FIG. 8 illustrates a data communication operation according to the present invention.

Referring to FIG. 8, the transmitting communication apparatus repeatedly illuminates on and off the corner blocks of a color block array representing data in step 810 and outputs RGB colors in a number of blocks neighboring to the flickering corner blocks in step 820.

In step 830, the transmitting communication apparatus outputs information indicating the total number of blocks of the color block array and the shape of the color block array in the other of the blocks neighboring to the corner blocks.

The transmitting communication apparatus monitors reception of a response message indicating that the color blocks are recognizable from the receiving communication apparatus in step 840. The receiving communication apparatus captures the display of the transmitting communication apparatus and senses the color blocks from the captured image. If the recognition rate of each color block is equal to or greater than a set value, the receiving communication apparatus transmits the response message indicating the color blocks are recognizable to the transmitting communication apparatus. The set value may be a recognition rate range between 70% and 90%, which varies with factors such as the statuses of the display and the camera, an ambient environment of the communication apparatus, and the performance of an image processor.

Upon receipt of the response message indicating that the color blocks are recognizable in step 840, the transmitting communication apparatus increases the total number of color blocks in the color block array to a value by decreasing a block size in step 870. When the response message indicating that the color blocks are recognizable has not been received or upon receipt of a response message indicating that the color blocks are not recognizable in step 840, the transmitting communication apparatus sets the number of color blocks that the receiving communication apparatus approved by a previous response message in step 850. The transmitting communication apparatus transmits data in the set number of color blocks, in step 860.

A block size can be adjusted to lead to a maximum data rate in the above-described data communication method according to the present invention.

As described above with reference to FIG. 8, a maximum block number that enables display and recognition in the transmitting and receiving communication apparatus is achieved and data transmission is performed in smaller blocks. Empirically, when a block with about 10×10 pixels is in one color on the display of the transmitting communication apparatus, 32 colors are identifiable in an image captured by the camera of the receiving communication apparatus.

For instance, for a color block array with block size 32×24, 754,974,720 bits (=(32 blocks×24 blocks)×(32 red×32 green×32 blue)×30 fps) are transmittable in the communication method of the present invention. That is, transmission is possible at 754 Mbits per second.

Moreover, if a time required for image processing to identify an image captured by the camera of the receiving communication apparatus is ⅓ second, 251,658,240 bits (=(32 blocks×24 blocks)×(32 red×32 green×32 blue)×10 fbs) are transmittable. In other words, 251 Mbits are transmitted per second.

If one second is taken to identify colors, 25,165,824 bits (=(32 blocks×24 blocks)×(32 red×32 green×32 blue)×1 ibs) are transmittable. In other words, 25 Mbits are transmitted per second.

When errors occur during transmission and corner detection is not performed, the number of transmittable bits is 17,301,504(=(30 blocks×22 blocks)×(32 red×32 green×32 blue)×1 fbs×80% recognition rate). That is, 15 Mbits can be transmitted per second. Hence, when ambient lighting is poor and errors are taken into account, data transmission is possible at 10 Mbps or higher.

As described above, 10-Mbps data transmission is possible even with a 320×240-pixel display with which a mobile device is usually equipped and a conventional lowest specification camera with 300 thousands of pixels. Therefore, the data transmission rate is increased exponentially with the use of a camera with more pixels and a display with a higher resolution.

As is apparent from the above description, the present invention enables large-data transmission and reception by a simple image processing algorithm using a digital camera included in a mobile device such as a conventional mobile phone. Also, a data rate can be increased exponentially according to the resolutions of a camera and a display and a color resolution technology.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A data communication apparatus based on digital image processing, comprising:
   a display for displaying a color block array including color blocks corresponding to transmission data;
   a camera for capturing an image of a color block array displayed on a display of a transmitting side;
   a storage for storing a code table including information about colors mapped to data values; and
   a Digital Signal Processor (DSP) for creating a color block array by converting transmission data to color blocks according to the code table during data transmission, and identifying the color block array in the image captured by the camera, detecting colors of the color blocks in the color block array, and extracting data values corresponding to the detected colors during data reception.

2. The data communication apparatus of claim 1, wherein the storage further includes color information corresponding to numbers of color blocks and color block array shapes.

3. The data communication apparatus of claim 1, wherein the DSP repeatedly illuminates on and off color blocks at corners of the color block array during the data transmission and locates the color block array representing data by identifying repeatedly flickering corner blocks during the data reception.

4. The data communication apparatus of claim 3, wherein the DSP calibrates brightness of the color block array representing data by identifying the flickering corner blocks of the color block array during the data reception.

5. The data communication apparatus of claim 1, wherein the DSP displays red, green and blue in three blocks neighboring to corner blocks of the color block array during the data transmission and calibrates red, green and blue colors by detecting colors of blocks neighboring to corner blocks of the color block array during the data reception.

6. The data communication apparatus of claim 2, wherein the DSP displays a color corresponding to a current number of color blocks and a current color block array shape in a block neighboring to a corner block of the color block array during the data transmission, and detects information about the number of color blocks and a color block array shape from a block neighboring to a corner block of the color block array during the data reception.

7. The data communication apparatus of claim 1, further comprising a controller for setting a maximum recognizable number of color blocks for an initial color block array by increasing the number of color blocks until a response message is received indicating that the color blocks are not recognizable from a receiving side, during the data transmission and controlling transmission of a response message indicating that color blocks are recognizable to the transmitting side, if a recognition rate of each color block in an image that is captured when the transmitting side sets the number of color blocks for an initial color block array is equal to or greater than a set value.

8. A data transmission method for data communication based on digital image processing, comprising:
converting transmission data to color blocks by a Digital Signal Processor (DSP) according to a code table including information about colors mapped to data values;
determining a number of the color blocks to be included in a color block array to be displayed on a display; and
displaying on a display the color block array including the determined number of color blocks;
wherein a block of the color block array is a color that indicates how many blocks exist in the color block array.

9. The data transmission method of claim 8, wherein color blocks at corners of the color block array repeatedly flicker.

10. The data transmission method of claim 8, wherein the color block array has three red, green and blue color blocks adjacent to corner blocks.

11. The data transmission method of claim 8, wherein the block is adjacent to a corner block of the color block array and is a color corresponding to a current color block array shape.

12. The data transmission method of claim 8, wherein the determination comprises setting a maximum number of color blocks recognizable to a receiving side for the color block array by increasing the number of color blocks until a response message indicating that the color blocks are not recognizable is received from the receiving side.

13. A data reception method for data communication based on digital image processing, comprising:
capturing an image of a color block array displayed on a display of a transmitting side by a camera;
identifying the color block array in the captured image by a Digital Signal Processor (DSP); and
detecting colors of color blocks in the color block array by the DSP and extracting data values corresponding to the detected colors according to a code table including information about colors mapped to data values.

14. The data reception method of claim 13, wherein the color block array identification comprises locating the color block array representing data by determining repeatedly flickering blocks of the captured image as corner blocks of the color block array and displaying the data.

15. The data reception method of claim 13, further comprising calibrating brightness of the color block array representing data by identifying flickering corner blocks of the color block array.

16. The data reception method of claim 13, further comprising calibrating red, green and blue colors by detecting colors of blocks adjacent to corner blocks of the color block array.

17. The data reception method of claim 13, further comprising detecting information about the number of color blocks and a color block array shape from a block adjacent to a corner block of the color block array.

18. The data reception method of claim 13, further comprising transmitting to the transmitting side a response message indicating that color blocks are recognizable, if a recognition rate of each color block in an image that is captured when the transmitting side sets the number of color blocks for an initial color block array is equal to or greater than a set value.

* * * * *